Feb. 14, 1950     F. TERDINA ET AL     2,497,424
LEAD SCREW STOP MEANS
Filed Jan. 25, 1946
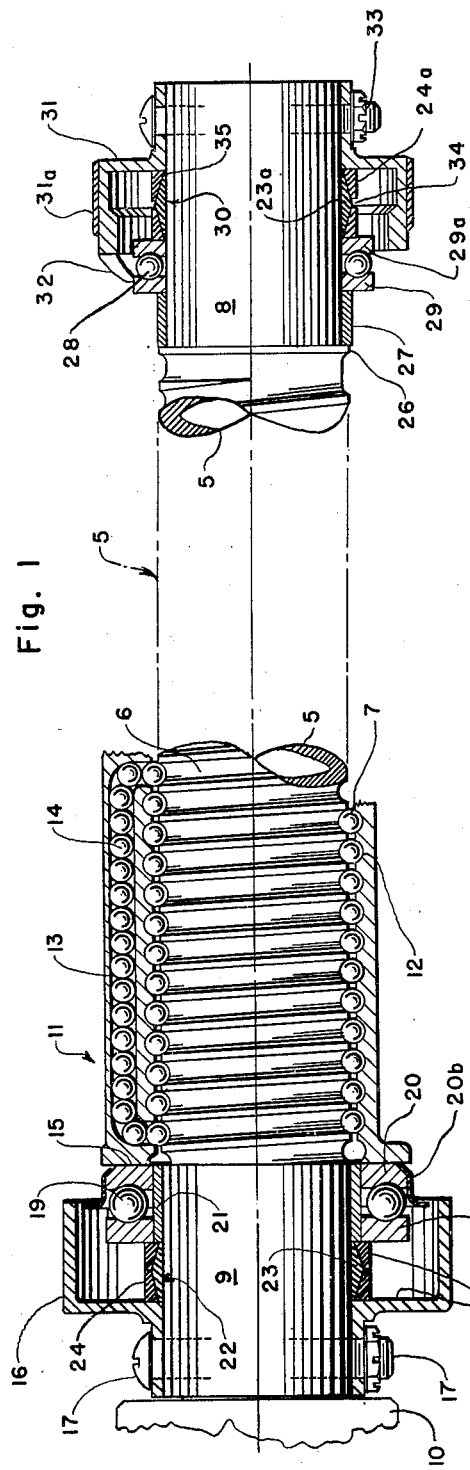
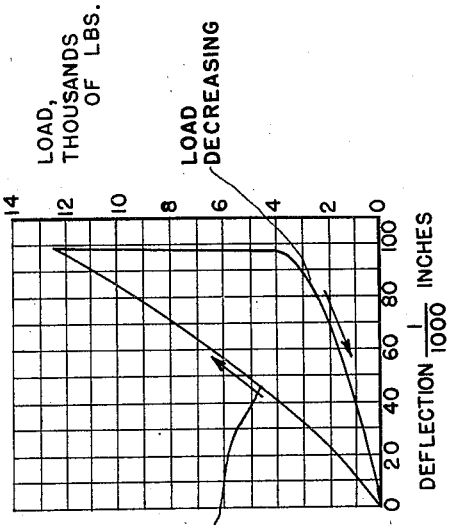
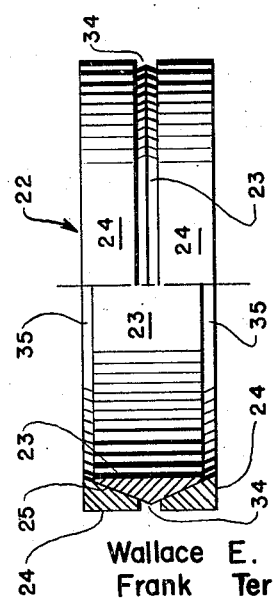
Wallace E. Skidmore &
Frank Terdina
    *INVENTORS.*
BY *James M. Clark*
THEIR PATENT ATTORNEY Patented Feb. 14, 1950

2,497,424

UNITED STATES PATENT OFFICE 2,497,424

LEAD SCREW STOP MEANS

Frank Terdina and Wallace E. Skidmore, Seattle, Wash., assignors to Boeing Airplane Company, a corporation of Delaware Application January 25, 1946, Serial No. 643,415

12 Claims. (Cl. 74—424.8)

The present invention relates generally to improved limit stop means and more particularly to arrangements of such stop means of a shock absorbing type with lead screw actuating mechanisms.

Lead screw or jack type actuating mechanisms have been used in many fields but their use has frequently met with serious difficulties as a result of the nut element binding or jamming at either terminal of the threaded member thereby requiring relatively high break-away torque to permit the return movement of the nut member. These binding tendencies of the elements of lead screw actuating mechanisms have invariably led to failures of the power transmission mechanism, with resulting inoperation of the component actuated by the lead screw, frequently causing serious damage to the machine or vehicle with which the component is equipped. Too abrupt stopping or arresting of the moving elements may also result in damage to the screw elements and their failure to operate. Lead screw or jack actuating mechanisms of this general type are commonly used in aircraft and other vehicles and have been extensively utilized for the retraction of aircraft landing gears, floats, bomb racks, turrets and other components.

In the operation of retractable aircraft landing gears, binding or jamming at the lead screw stops has frequently contributed to failure of the actuating mechanism and inability of the pilot to extend his landing gear. These mechanisms are usually driven by an electric or fluid motor provided with a plate clutch which is permitted to slip when the nut element stops against one of the lead screw terminals. Such slipping of the clutch plate occasionally causes overheating and welding together of certain of the plates with the result that the motor output shaft torque can become sufficient to overcome the locking torque and raise the wheel. Inasmuch as the plate clutch is then no longer capable of slipping and absorbing the inertia at the upper screw terminal the high resistance to the motor torque usually causes shearing of the clutch. Accordingly, when the motor is again energized for extending the wheels no torque is transmitted through the sheared clutch and the landing gear fails to extend. Our invention, consisting essentially of a low friction ball type nut and lead screw actuating mechanism provided with beveled ring stop assemblies at each terminal of the lead screw, and intermediate ball thrust bearings in an improved relationship, entirely eliminates and overcomes the difficulties met with in prior devices.

The present invention is directed to a nut and lead screw combination of relatively low friction requiring a minimum of torque for its operation, is advantageously arranged with wedging spring elements forming a tensional and compressional friction bumper with an interposed ball thrust bearing. The ball thread actuating mechanism is of such low frictional characteristics as to be capable of permitting extension of the landing gear when acted upon only by gravitational forces, and the simplicity of construction, the extreme compactness and high capacity of the wedging spring stop assemblies permits of a relatively light, compact and efficient lead screw actuating mechanism. While such beveled ring units have been proposed heretofore as substitutes for flexural or torsional springs, they have not heretofore been utilized to their complete advantage in lead screw mechanisms of the type disclosed herein. As embodied in the present invention these wedging spring elements provide load characteristics of gradual or uniform thrust absorption with a large absorption of energy. The disclosed arrangement of a beveled ring limit stop in conjunction with a ball thrust bearing in a lead screw mechanism is such as to maintain the value of the initial settings under varying load and temperature conditions. In addition to its non-binding resilient thrust absorbing qualities the present stop means is comprised of a minimum number of parts giving fool-proof and satisfactory service under all operating conditions.

It is accordingly a major object of the present invention to provide an improved limit stop means for lead screw actuating mechanisms. A further purpose resides in the provision of such a stop which is non-binding or jamming, which is simple and of low cost construction. Another objective lies in the provision of limit stop means having advantageous load characteristics of gradual or uniform thrust absorption as against a rapid release of energy which permits a reduction of the break-away torque requirements of the motor or other power source.

It is the further purpose of this invention to provide an improved limit stop which is capable of absorbing a large part of the energy expended during its braking of the moving parts. A further objective resides in the provision of a new and advantageous combination of elements in a lead screw actuating mechanism including a low friction ball type lead screw thread and nut of such low friction as to be capable of extending a landing gear when acted upon only by gravitational forces.

An additional object of the present invention is directed to the provision of improved limit stop means which are capable of maintaining the values of its initial settings under varying loads and temperature conditions, and which may be used separately or in conjunction with conventional dog stops or other positive limiting stops of the non-resilient type. Further objects and advantages of the present invention will become apparent to those skilled in the art after reading the present description together with the accompanying drawings forming a part hereof, in which:

Fig. 1 is a cross sectional view of the improved lead screw actuating assembly including the ball threaded nut member, the ball thrust bearings and the beveled ring terminal stops;

Fig. 2 is an enlarged part cross-sectional view of the beveled ring stop means utilized therein; and Fig. 3 is a graph illustrating the loading and unloading characteristics of the improved stop means forming a part of this invention.

The screw actuating mechanism of Fig. 1 comprises the threaded lead screw 5 provided with helical grooves or ball threads 6 extending continuously through its intermediate portion to receive the friction reducing spherical balls 7. Beyond the threaded portion the lead screw member 5 is provided with a lower or outer terminal portion 8 and an upper or main terminal portion 9. Adjacent its upper terminal portion there is provided a housing member 10 by means of which the lead screw assembly may be pivotally or otherwise attached to the adjacent structure in any one of a number of well known manners and through which housing 10 the lead screw 5 may be rotated for axial translation of the nut member 11 therealong. The nut member 11 is provided internally with a continuous helical groove or ball thread 12 preferably of like pitch and conformation as the thread 6 on the lead screw 5 to receive the balls 7 therebetween. The nut element 11 is also preferably provided with one or more spaces 13 within which a series of spherical balls 14 are permitted to circulate to and from their positions intermediate the inner face of the nut member and the outer face of the lead screw member.

The nut member 11 is shown fragmentarily in Fig. 1 for explanatory purposes but it will be understood that this member may preferably be provided with an elongated tubular portion, extending toward the right in this figure, being of a diameter which will permit telescoping in an axial direction over the bearing portion of the lower terminal 8 of the lead screw. The opposite end of the nut member 11 is provided with an end abutment face 15 against which the limit stop forces are exerted. The upper terminal portion 9 of the lead screw is provided with an annular end wall bracket 16 provided with an inner hub and outer flange portion interconnected by a web providing an inner abutment face 18. The hub portion of the end wall bracket 16 is fixedly attached to the terminal portion 9 by the through bolt 17 and its outer flanged portion is adapted to provide a housing for the ball thrust bearing 19 and the beveled ring stop assembly 22.

The thrust bearing 19 is provided with an outer race 20 which abuts against the end face 15 of the nut member, and together with its inner race 20a, is retained upon the thrust bearing band 21 which is slidably fitted upon the cylindrical portion 9. The outer edge of the annular race 20 is beveled to engage the retainer element 20b which serves to prevent the bearing 19, as well as the ring assembly 22, from dropping out of place when the nut moves away from the bearing. The entire assembly is preferably provided with a dust cover (not shown) to protect the same from dirt and grit.

The beveled ring stop assembly 22 is comprised of a central annular unit 23 of triangular section having an inside diameter which slidingly fits upon the cylindrical upper terminal portion 9. As may be seen more clearly in the detailed cross section in Fig. 2 the upper surfaces 25 of the triangular member 23 slope toward an apex at approximately a 15° angle with respect to the axis of the cylindrical bore and have disposed thereon the complementarily faced outer annular elements 24. The wedge element 23 takes the form of a wide base isosceles triangle and the complementary elements 24 are preferably right angle triangles with their adjacent more acute angles cut off square at 34. In the normal uncompressed relationship of the elements 23 and 24 of the wedge ring stop assembly as shown in Figure 2 the outer elements 24 are separated such that a space 34 exists between their inner edges, and their outer edges overlie the lateral edges of the inner central element 23 by the distances indicated by the spaces 35.

It will accordingly be understood that the separated and uncompressed relationship of the wedge ring elements in Figure 2 is the same as that occupied by the respective elements at the lower terminal portion 8 of the lead screw as shown in Figure 1. Inasmuch as the nut 11 is shown fully compacted or retracted against the thrust bearing 19 and the stop assembly 22 at the upper terminal portion 9 of the lead screw the elements 23 and 24 in this figure are fully compressed in the axial direction between the inner abutment face 18 of the end bracket 16 and the thrust bearing 19. In this fully compacted state the adjacent ends of the outer elements 24 are brought together occupying the space 34 such that they abut in the region of the apex of the inner central element 23, and the outer edges of each element 24 become radially aligned with the corresponding outer edges of the central element 23. As indicated above, the corresponding elements 23a and 24a of the outer stop assembly 30 are shown in their uncompressed relationship in Fig. 1.

The compacting of the elements of the wedging spring assembly as shown at the upper terminal in Figure 1 results in the creation of compression within the central element 23 and the tensioning of the outer element 24 as a result of the deflection caused by the wedging action as the adjacent surfaces of each slide along the inclined wedging surfaces 25. Highly satisfactory results have been obtained from wedging elements made of steel although other suitable materials may be used to obtain the desired load characteristics. More resilient materials such as rubber composition and neoprene have been tested but have not proven satisfactory in all applications, particularly at lower temperatures.

Using steel ring spring elements 23 and 24 a load characteristic of gradual and substantially uniform thrust absorption was obtained which at the same time provided a relatively large absorption of energy. These characteristics will be more clearly seen from the graph in Figure 3 in which the deflection is 1/1000 inch has been plotted against the load in thousands of pounds. It will be noted that starting from zero load and deflection, obtaining in the beveled ring stop assembly 22 before the face 15 of the nut member 11 imparts axial movement to the thrust bearing 19 and progressing through to the complete absorption of the load, the load increases quite uniformly as the deflection or compacting occurs and reaches a maximum of approximately 12,500 pounds at about .097 in. deflection. Thus the energy input to the stop assembly is approximately $$\frac{12500\#}{2}(.097'') = 606''\#$$

On the other hand, as the direction of torque applied by the power source is reversed for the extension of the lead screw assembly, the initial force exerted by the stop assembly drops immediately, with practically no travel of the nut, to about 5000 pounds, then decreases approximately uniformly to zero with expansion of the stop assembly. The energy return is thus about $$\frac{5000\#}{2}(.097'') = 242''\#$$

The difference between the energy input of 606"# and this energy return, 242"#, or 364"#, represents the energy absorption of the stop assembly. In this particular case it will be seen that the device has absorbed some 60% of the energy expended upon it. This ability to dissipate substantial amounts of energy makes this device particularly well suited for use as a nut stop.

It will be understood that the nut member 11 is provided with a similar but opposed abutment face corresponding to the end face 15 which is adapted to bear against the inner face 29 of the thrust bearing 28 as the lead screw assembly is fully extended. This causes similar axial transmission of thrusts through the bearing 28 to the lower stop assembly 30 which is restrained from outward axial movement by the end wall bracket 31 attached to the lower terminal portion 8 by the bolt 33. Movement of the assembly in the opposite direction is prevented by the annular band 27 and the shoulder 26 forming the end of the threaded portion 6. The end wall bracket 31 may preferably be provided with a bushing 31a over which the inner surface of a sleeve (not shown) forming a part of the nut member 11 may slide as the screw mechanism is extended or retracted. The end bracket 31 may further be provided with a positive dog stop or clutch portion 32 adapted to be engaged by a corresponding dog element on the nut member 11 to provide a positive nonresilient stop after full application of the load has been applied to the lower resilient stop assembly 30, and after the latter has been fully compressed.

By means of the disclosed ball thread nut and lead screw, the beveled ring stop assemblies and the interposed ball thrust bearings, an improved lead screw actuating mechanism has been obtained which eliminates all of the aforementioned difficulties and has proven highly satisfactory under actual service conditions. While a preferred embodiment of the present invention has been described in connection with a screw mechanism of the rectilinear or push-pull type in which the sleeve of the nut member and the screw member telescope, it is not limited thereto, but is also adapted to be used with nut members having a pivotal connection adjacent the portion 11 and without a telescoping sleeve. The disclosed stop means is not limited to use with the ball-bearing screw illustrated herein but also has been used successfully with a conventional Acme thread screw. In this arrangement it serves an additional function in that it maintains an axial load on the nut, thus keeping the threads tightly engaged and preventing relative rotation between the nut and the screw as a result of vibration. To provide this function it had formerly been necessary to use a synthetic rubber bumper.

Other forms and modifications of the present invention both with respect to the general arrangement as well as the details of the respective parts which may occur to those skilled in the art after reading the foregoing description are all intended to come within the scope and spirit of this invention as more fully set forth in the appended claims.

We claim:

1. In a screw retracting mechanism including threaded nut and screw members arranged for relative axial movement upon rotation of either member, resilient stop means for limiting said axial movement comprising a plurality of telescopic annular elements having complementary tapered friction surfaces arranged to resiliently oppose compressive axial forces and permit a reduction in the torque required to reverse said mechanism.

2. Nut and screw actuating members having abutment shoulders carried by said nut and screw members, a resilient stop assembly disposed between said abutment shoulders of said members comprising an inner beveled ring and a pair of outer complementary beveled rings arranged to resiliently oppose axial compression with a uniform deflection under increasing compressive loads and a rapid release of energy absorbed from such loads with a relatively small accompanying deflection.

3. A lead screw actuating mechanism comprising a threaded screw member, a nut member threadedly engaging said screw member, reversible driving means for imparting relative rotation between said members, an abutment fixedly attached to said screw member and an assembly of beveled annular rings interposed between said abutment and said nut member arranged to be axially compressed for the resilient limitation of movement of said nut member against said abutment whereby the break-away reverse torque requirements are reduced.

4. A lead screw actuating mechanism comprising a relatively rotatable threaded screw member, a non-rotatable nut member threadedly engaging said screw member, means to rotate said screw member for axial movement of said nut member therealong, a transverse abutment carried by said screw member, and stop means including a plurality of axially tapered annular elements interposed between said abutment and said nut member arranged to resiliently limit said relative axial movement of said screw and nut members.

5. A lead screw actuating mechanism comprising a threaded screw member, a threaded nut member co-axially disposed about said screw member, said members having threads of semi-circular cross-section, a plurality of spherical balls disposed within the threads of said members, an abutment shoulder carried by said screw member and stop means including a plurality of beveled ring elements co-axially disposed about said screw member between said abutment shoulder and said nut member arranged to resiliently limit axial movements of said screw and nut members.

6. A lead screw actuating mechanism comprising a threaded screw member, a threaded nut member coaxially engaged with said screw member, a shoulder portion carried by said screw member, a plurality of axially tapered stop rings in wedging engagement disposed adjacent said shoulder portion and thrust bearing means disposed between said stop rings and said nut member arranged to prevent transmission of rotation between said stop rings and said nut member.

7. In a lead screw actuating mechanism, the combination of a rotatable member and a member movable longitudinally thereof to define a rectilinear stroke of fixed length, stop shoulders carried by the movable member disposed adjacent the opposite ends of said member to define said stroke length, stop means carried by the rotatable member in a co-axial disposition thereon, said stop means including an abutment member fixedly attached to said rotatable member, a plurality of telescopic annular rings having complementary tapered friction faces, one of said rings abutting said abutment member for the prevention of longitudinal movement with respect to the axis of said rotatable member, bearing means carried by said rotatable member disposed between said annular rings and the said rotatable member, whereby said telescopic annular rings are wedgingly and frictionally compressed between said abutment member and said bearings means to resiliently absorb the axial force caused by the engagement of the shoulder of said movable member with the stop means carried by said rotatable member and to materially reduce the torque required for the rotation of said rotatable member for backing-off said movable member.

8. Stop mechanism for a lead screw actuating device having a relatively rotatable screw member and a non-rotatable nut member arranged for translatory axial movement therealong, said stop mechanism disposed between opposed portions of said screw and nut members and comprising a plurality of telescopic annular rings having complementary tapered friction faces arranged to permit axial compression of said stop mechanism between the opposed portions of said members upon approaching axial movements and rapid release of the energy stored during said axial compression for reduction in the break-away torque required to reverse the relative axial movement between said screw and nut members.

9. A lead screw actuating mechanism including a threaded screw member, a nut member threadedly engaging said screw member, said members having axially opposed abutment portions, and stop means including a plurality of axially tapered ring elements disposed between the axially opposed abutment portions of said members arranged to resiliently limit relative axial movement therebetween and to provide for a rapid release of the energy so absorbed at the limits of said relative axial movements.

10. In a lead screw actuating mechanism including a relatively rotatable screw member having an abutment portion and a non-rotatable nut member having an abutment portion arranged for translatory axial movement along said screw member, a non-jamming stop assembly disposed between the abutment portions of said screw and nut members comprising a plurality of telescopic annular rings having complemental tapered friction faces arranged to permit limited axial compression of said stop assembly between said abutment portions at the limit of said translatory axial movement in a first direction and the subsequent rapid release of the energy stored during said axial compression upon movement of said nut member in the opposite direction.

11. A lead screw actuating mechanism including a threaded screw member, a threaded nut member engageable with said screw member, means to rotate one of said members for axial movement along the other said member, transverse abutments carried by each said member, and stop means including a plurality of axially tapered annular elements disposed between said abutments arranged to resiliently limit said relative axial movement of said members.

12. Stop mechanism for a lead screw actuating device having a relatively rotatable screw member and a non-rotatable nut member arranged for translatory axial movement therealong, abutment portions carried by each said member, actuating means for rotating said screw member for imparting approaching and receding axial movements of said members toward and away from a limit position defined by said abutment portions, said stop mechanism disposed between said abutment portions carried by said members and including a plurality of telescopic annular rings having complementary tapered friction faces arranged to be axially compressed between said abutment portions upon approaching said liimt position and to provide a rapid release of the energy stored during said axial compression for the reduction in the break-away torque required by said actuating means to reverse the rotation of said screw member to accomplish the receding movement of said nut member from said limit position.

FRANK TERDINA.
WALLACE E. SKIDMORE.

REFERENCES CITED

The following references are of record in the file of this patent:

UNITED STATES PATENTS

| Number | Name | Date |
|---|---|---|
| 1,656,279 | Kreissig | Jan. 17, 1928 |
| 1,908,655 | Bell | May 9, 1933 |
| 1,967,482 | Schmidt | July 24, 1934 |
| 1,984,565 | Bell | Dec. 18, 1934 |
| 2,240,977 | Bryant | May 6, 1941 |
| 2,297,137 | Fennema | Sept. 29, 1942 |
| 2,398,841 | Morris | Apr. 23, 1946 |

FOREIGN PATENTS

| Number | Country | Date |
|---|---|---|
| 630,555 | France | Dec. 5, 1927 |